United States Patent
Nelson et al.

(10) Patent No.: US 7,123,693 B2
(45) Date of Patent: *Oct. 17, 2006

(54) METHOD AND APPARATUS FOR INCREASING THE RELIABILITY OF AN EMERGENCY CALL COMMUNICATION NETWORK

(75) Inventors: Michael Jay Nelson, Louisville, CO (US); Gregory Wilfred Bruening, Boulder, CO (US); Peter Roy Schmidt, Westminster, CO (US); Robert Allen Sherry, Aurora, IL (US); Stephen Marc Meer, Niwot, CO (US)

(73) Assignee: Intrado Inc., Longmont, CO (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/816,735

(22) Filed: Apr. 2, 2004

(65) Prior Publication Data
US 2005/0201529 A1   Sep. 15, 2005

Related U.S. Application Data

(60) Provisional application No. 60/552,831, filed on Mar. 13, 2004.

(51) Int. Cl.
*H04M 11/00* (2006.01)
(52) U.S. Cl. ........................ 379/45
(58) Field of Classification Search .............. 379/45, 379/37, 38, 39, 40, 93.17, 93.25, 90.01
See application file for complete search history.

(56) References Cited

U.S. PATENT DOCUMENTS

| | | | |
|---|---|---|---|
| 6,151,385 A | 11/2000 | Reich et al. | |
| 6,385,302 B1 | 5/2002 | Antonucci et al. | |
| 6,415,018 B1 | 7/2002 | Antonucci et al. | |
| 6,504,909 B1 | 1/2003 | Cook et al. | |
| 6,584,307 B1 | 6/2003 | Antonucci et al. | |
| 6,587,545 B1 | 7/2003 | Antonucci et al. | |
| 6,671,350 B1 * | 12/2003 | Oxley | 379/45 |
| 6,707,888 B1 | 3/2004 | Cope | |
| 6,771,742 B1 * | 8/2004 | McCalmont et al. | 379/45 |
| 6,775,356 B1 * | 8/2004 | Salvucci et al. | 379/45 |
| 2002/0057764 A1 | 5/2002 | Salvucci et al. | |
| 2003/0086539 A1 | 5/2003 | McCalmont et al. | |

* cited by examiner

*Primary Examiner*—Stella Woo

(57) ABSTRACT

The invention includes an emergency services network comprising a plurality of resources, a plurality of emergency services, and a Service/Name Resolution (SNR) system connected to a transport network. In operation, one of the resources receives a retrieval key for an emergency event from a conforming emergency system. The resource transmits the retrieval key to the transport network. The SNR system receives the retrieval key over the transport network and identifies at least one of the emergency services corresponding with the retrieval key. The SNR system initiates the transfer of the retrieval key to the identified emergency services. The identified emergency services then perform services corresponding with the retrieval key.

68 Claims, 8 Drawing Sheets

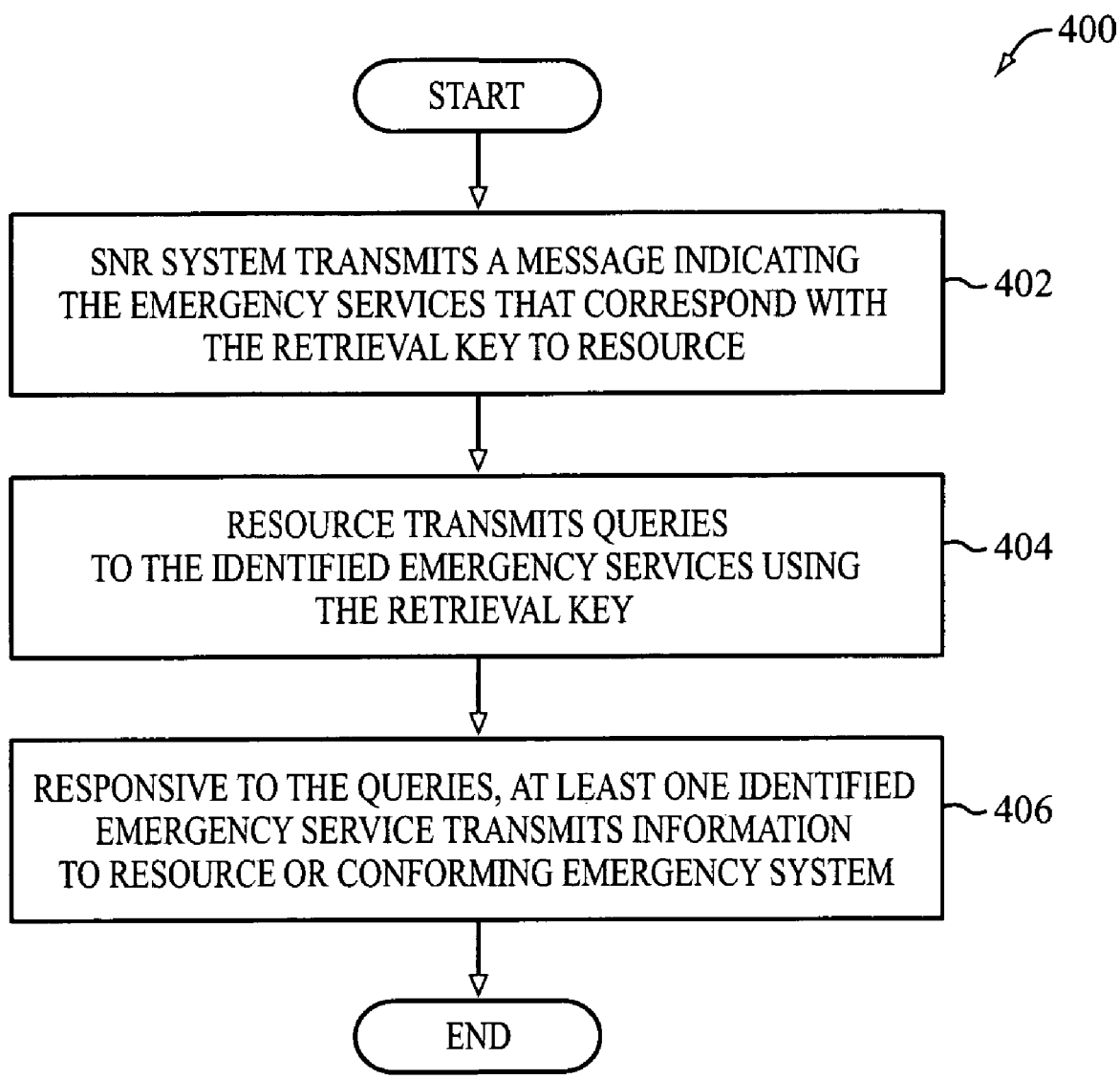

METHOD AND APPARATUS FOR INCREASING THE RELIABILITY OF AN EMERGENCY CALL COMMUNICATION NETWORK

RELATED APPLICATIONS

This non-provisional application claims priority to U.S. provisional application 60/552,831, which was filed on Mar. 13, 2004.

BACKGROUND OF THE INVENTION

1. Field of the Invention

This invention relates to emergency services, and in particular to an enhanced emergency services network that reduces the time required to obtain the data necessary to handle an emergency event. This invention further relates to an enhanced emergency services network which reduces the time required to determine the physical location of a calling station. The invention still further relates to an enhanced emergency services network having facilities of increased flexibility for obtaining the information required to handle an emergency event. The invention still further relates to an emergency services network which enables the introduction of new emergency services and which associates such new emergency services with emergency events served by the emergency services network.

2. Statement of the Problem

In the United States, basic 9-1-1 service is an emergency reporting service where a calling party can dial 9-1-1 in emergency situations. The call is answered at a Public Safety Answering Point (PSAP, also known as a "Public Safety Access Point"). An operator at the PSAP converses with the calling party to determine information on the emergency situation. For instance, the operator may ask the calling party for his/her name, the nature of the emergency, and the location of the emergency, etc. Based on the information gathered by the operator, the operator then contacts emergency personnel to respond to the emergency.

Enhanced 9-1-1 service (E9-1-1) has the added feature of automatically providing the operator with some information on the calling party. For instance, E9-1-1 service includes the added features of Automatic Number Identification (ANI) and Automatic Location Identification (ALI). With Automatic Number Identification (ANI), the operator is automatically provided with telephone number of the phone placing the call for emergency services (e.g., a 9-1-1 call). With Automatic Location Identification (ALI), the PSAP, or another device, queries an ALI database for information on the physical location of the calling party's phone. An ALI database stores records of telephone numbers. A record in the ALI database contains information (such as a street address) on a physical location that corresponds with a telephone number. Responsive to a query from the PSAP, the ALI database returns the location information for the calling party. With the telephone number and the location information, the operator can more effectively handle the emergency call. Other countries have emergency services similar to this.

Traditional communication networks have a rigid architecture for providing emergency services. In a traditional communication network, a PSAP connects to a pair of ALI databases in the emergency services network. The PSAP connects to each ALI database over a dedicated point-to-point connection. The ALI databases are the only resources in the emergency services network that connect with the PSAP and that can serve a request from the PSAP. The PSAP is dependant on the pair of ALI databases as the interface to the emergency services network.

Traditional emergency services networks are vulnerable to undesirable delay in providing the PSAP with the information for handling emergency calls. For example, if the PSAP receives an emergency call, the PSAP queries the ALI database (using the ANI for the emergency call) for location information on the calling party. If the ALI database contains information for the ANI, then the ALI database may promptly return location information to the PSAP. However, if the ALI database does not contain information for the ANI (such as for a wireless call), then the ALI database needs to access other databases or systems to retrieve information for the ANI. The ALI database may not know which other databases or systems contain information for the ANI. Based on the ANI, the ALI database can transmit a query to a database or system that is more likely to contain information for the ANI. For instance, if the ANI indicates a wireless number for a particular wireless carrier, then the ALI database may transmit a query to a Mobile Positioning Center (MPC) or a Gateway Mobile Location Center (GMLC) for that wireless carrier. An MPC receiving the query may have to forward the query to another database, and so on until a database or system is reached that includes information for the ANI. The ALI database may spend precious time querying multiple databases or systems trying to locate information for an ANI.

Also, the ALI database may not know of new databases or systems that have been added to the emergency services network that can provide valuable information or services. The network structure is very tightly connected (via dedicated connections), and the addition of new emergency services requires an extensive re-work of network components.

Unfortunately, the ALI database takes time in finding what databases or systems contain information for the ANI. Also, the interchange of information between the ALI database and other databases consumes a finite amount of time during which the information required by the PSAP is not immediately available. Such delays are undesirable in emergency services networks, as the PSAPs need information as soon as possible to best handle emergency calls.

SUMMARY OF THE SOLUTION

The invention helps solve the above and other problems with an emergency services network that includes a Service/Name Resolution (SNR) system. The SNR system includes a directory correlating retrieval keys to emergency services in the emergency services network. The SNR system may quickly and efficiently identify emergency services that contain information for a retrieval key (or otherwise correspond with the retrieval key), and initiate the transfer of the retrieval key to the emergency services. The SNR system also provides a simpler and more efficient way of adding new emergency services and associating new emergency services with emergency events.

One embodiment of the invention comprises an emergency services network that includes a plurality of resources, a plurality of emergency services, and an SNR system connected to a transport network. In operation, one of the resources receives a retrieval key from a conforming emergency system (e.g., a PSAP). The resource transmits the retrieval key to the transport network. The SNR system receives the retrieval key over the transport network and identifies at least one of the emergency services corresponding with the retrieval key. The SNR system then initiates the transfer of the retrieval key to the identified emergency services. One or more of the identified emergency services receiving the retrieval key performs a service corresponding with the retrieval key.

In some embodiments, a service performed by an identified emergency service may be transmitting information corresponding with the retrieval key to the SNR system, the resource, or the conforming emergency system responsive to receiving the retrieval key. In other embodiments, a service performed by an identified emergency service may be notifying third parties of an emergency event.

The invention may include other networks, systems, and methods described below.

DESCRIPTION OF THE DRAWINGS

The same reference number represents the same element on all drawings.

FIG. 4A is a flow chart illustrating a method in an exemplary embodiment of the invention.

DETAILED DESCRIPTION OF THE INVENTION

Description of the Prior Art

Figure 1:
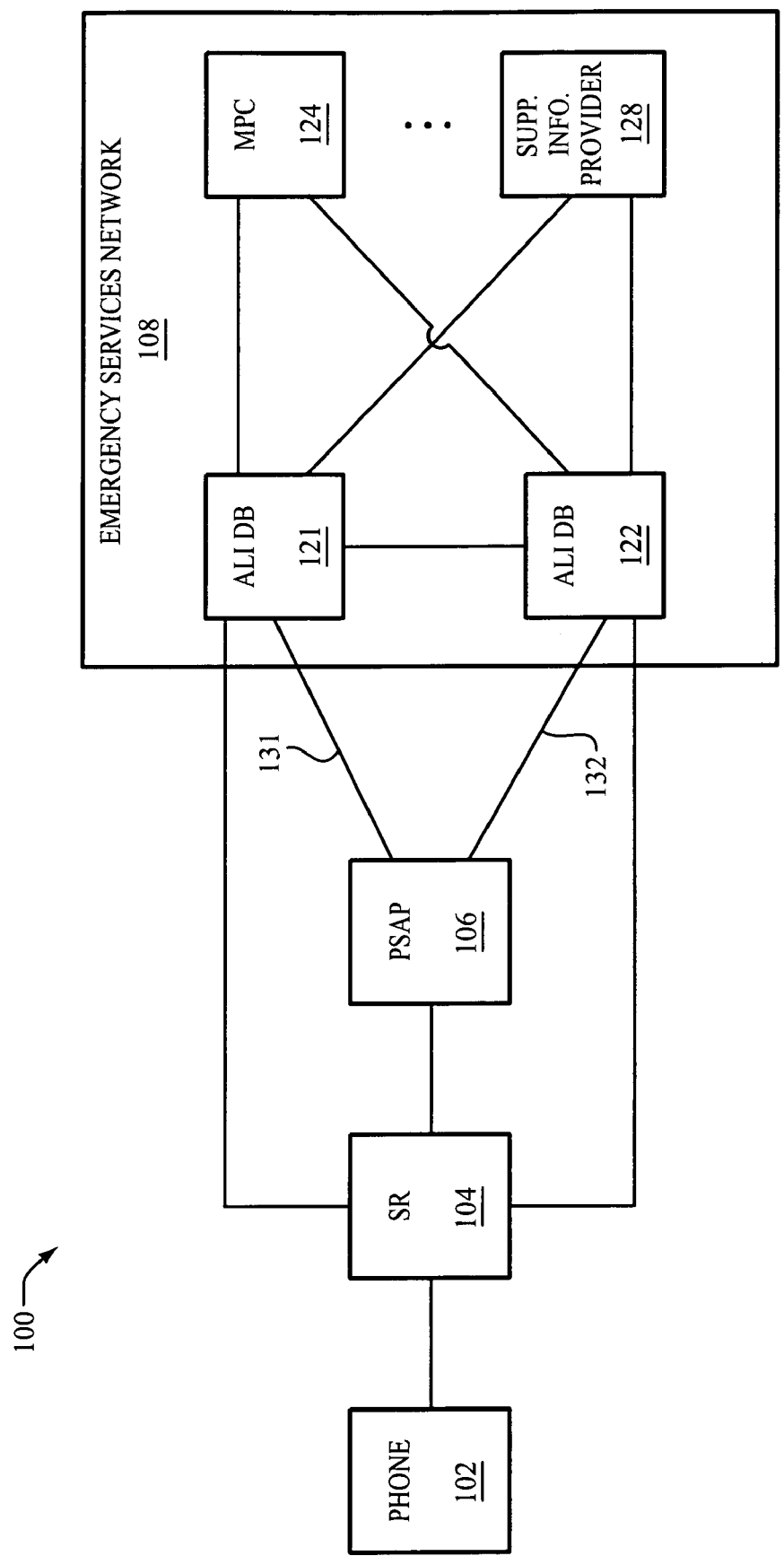
FIG. 1 illustrates a communication network that provides emergency services in the prior art, such as 9-1-1 service in the United States.

FIG. 1 illustrates a prior art communication network 100 that provides emergency services. Communication network 100 includes a telephone 102, a selective router (SR) 104, a Public Safety Answering Point (PSAP) 106, and an emergency services network 108. Emergency services network 108 includes two ALI databases 121–122, a Mobile Positioning Center (MPC) 124 (or a Gateway Mobile Location Center (GMLC)), a supplemental information provider 128, and other backend resources (not shown). Although a single MPC 124 and a single supplemental information provider 128 are illustrated in FIG. 1, emergency services network 108 generally includes multiple MPCs and supplemental information providers. As shown in FIG. 1, telephone 102 is connected to selective router 104. Selective router 104 is connected to PSAP 106 and ALI databases 121–122. PSAP 106 is connected to ALI databases 121–122. ALI database 121 is connected to ALI database 122, MPC 124, and supplemental information provider 128. ALI database 122 is connected to ALI database 121, MPC 124, and supplemental information provider 128.

Paired ALI databases 121–122 are used in emergency services networks, such as emergency service network 108, to add redundancy and reliability into the network. Each PSAP 106 (only one is shown) connects to two ALI databases 121–122. For the PSAP-ALI interface, PSAP 106 is connected to ALI database 121 by a dedicated point-to-point connection 131, and is connected to ALI database 122 by a dedicated point-to-point connection 132. The PSAP-ALI interface traditionally includes fixed point-to-point data circuits utilizing asynchronous data modems for the dedicated connections 131–132. In newer versions of the PSAP-ALI interface, dedicated connections 131–132 may include an upgraded transport protocol, such as Internet Protocol (IP) or X.25. Regardless of the transport protocol, the logical connections between PSAP 106 and ALI databases 121–122 remain point-to-point dedicated connections 131–132.

To illustrate how communication network 100 operates, assume that a caller dials 9-1-1 or a similar emergency number on telephone 102. Selective router 104 receives the emergency call, such as through a central office (not shown), a tandem switch (not shown), etc. Selective router 104 also receives an Emergency Service Number (ESN) associated with the location of the calling party from one or more ALI databases 121–122 or from another database (not shown). In FIG. 1, based on the ESN, selective router 104 selects PSAP 106 to handle the call and routes the emergency call to PSAP 106. Networks may route the emergency call to PSAP 106 in different ways depending on the desired implementation. Some examples of different implementations are illustrated in U.S. Pat. No. 6,415,018, U.S. Pat. No. 6,584,307, U.S. Pat. No. 6,385,302, and U.S. Pat. No. 6,587,545, which are all incorporated herein by reference to the same extent as if fully set forth herein.

Emergency services network 108, which provides E9-1-1 services, includes Automatic Location Identification (ALI) services. When PSAP 106 receives the emergency call, PSAP 106 also receives an ANI for the call. The ANI, which is the telephone number of the calling party telephone 102, allows an operator in PSAP 106 to call the calling party back if the call happens to be terminated. The ANI also allows the PSAP 106 to fetch information on the physical location of the calling party in order to dispatch the appropriate emergency personnel (e.g., police, ambulance, fire department). To fetch the location information, PSAP 106 generates a request for the location information that includes the ANI of telephone 102, and forwards the request to ALI database 121 over dedicated connection 131. PSAP 106 may forward the request to ALI database 122 over dedicated connection 132 in addition to forwarding the request to ALI database 121 or instead of forwarding the request to ALI database 121.

ALI database 121 receives the request for location information that includes the ANI. ALI database 121 searches for location information corresponding with the ANI. If ALI database 121 finds location information corresponding with the ANI, then ALI database 121 responds to PSAP 106 with the location information. If ALI database 121 does not find location information corresponding with the ANI, then ALI database 121 may have to query other ALI databases or other databases or systems for the location information.

ALI database 121 acts as an intermediary between PSAP 106 and the other emergency services in emergency services network 108. PSAP 106 does not directly connect with emergency services other than ALI databases 121–122. PSAP 106 communicates with MPC 124 and supplemental information provider 128 through one or both of ALI databases 121–122. For instance, if telephone 102 is a mobile phone, then ALI database 121 queries MPC 124 or another MPC (not shown) for location information corresponding with the ANI and forwards the location information to PSAP 106. ALI database 121 may provide supplemental information provider 128 with the ANI, and supplemental information provide 128 may provide services such as notifying third parties of the emergency call. In each of these cases, ALI database 121 interfaces PSAP 106 with the other emergency services.

When PSAP 106 receives a response from ALI database 121, PSAP 106 should be better informed to handle the emergency call. For instance, PSAP 106 should have location information for the calling party. PSAP 106 then informs the appropriate emergency personnel of the emergency call so that the emergency personnel can be quickly dispatched.

One problem with current emergency services networks is that the PSAP-ALI interface uses dedicated point-to-point connections 131–132 between PSAP 106 and ALI databases 121–122. PSAP 106 is not able to dynamically connect with another ALI database (not shown) or another resource in emergency services network 108. PSAP 106 is dependant on the pair of ALI databases 121–122 to provide information for an emergency call. If one of the ALI databases 121 were to be taken out of service for maintenance or upgrades, then PSAP 106 would be connected to a single ALI database 122 and become one-sided. If the remaining ALI database 122 was to go out of service, then PSAP 106 would not be able to adequately service emergency calls. Emergency services administrators try to avoid architectures that rely on a single device or system because of the higher possibility of a service outage.

Another problem with current emergency services networks is the traditional PSAP-ALI interface uses a limited message set. Most conventional PSAPs fundamentally include the same design as when they were initially conceived in the 1970's. The conventional PSAPs are configured to receive a fixed-length, pre-defined text string. The fixed-length text string limits the number of fields and the size of the fields that can be included in the text string. The small size of the text stream severely constrains the amount of information that the ALI database can provide to the PSAP, the context that can be created, and the data types that can be supported. Emergency services administrators have had to "overload" the text string, using the same fixed-length field for multiple purposes in different contexts, to provide the current services. New services or new capabilities are very difficult to add if the text string is overloaded by the current services. For instance, an ALI database would not be able to provide or would only be able to provide very limited individual medical information to the PSAP. Also, the technology does not lend itself to streaming video to the PSAP as the traditional message set does not have the capacity.

Another problem with current emergency services networks is that the PSAP-ALI interface model is a request-response model. The PSAP forwards a request for ALI information to the ALI database, and the ALI database provides a response to the PSAP. Under the current model, the PSAP has to initiate communication with the ALI database with a request for ALI information. The ALI database is not allowed or equipped to initiate a communication with the PSAP, or deliver ALI information to the PSAP unless the PSAP submits a request. The current PSAP-ALI interface model limits the types of enhanced services provided by the emergency services network.

Another problem with current emergency services network is that they are vulnerable to undesirable delay in providing the PSAP with the information for handling emergency calls. When an ALI database receives a request for information on an ANI, the ALI database may not know which databases or systems in emergency services network contain information for the ANI. The ALI database may spend precious time querying multiple databases or systems trying to locate information for an ANI. Also, the ALI database may not know of new databases or systems that have been added to the emergency services network that can provide valuable information or services.

The following example illustrates some of the problems and limitations of the current emergency services networks. Assume that telephone 102 comprises a mobile telephone and that a user of telephone 102 dials 9-1-1. Selective router 104 routes the 9-1-1 call to PSAP 106. PSAP 106 submits a request to ALI database 121 for information for the 9-1-1 call. The request includes an ANI. Responsive to receiving the request, ALI database 121 determines that the ANI is a pseudo-ANI corresponding with a wireless service provider for telephone 102. The ANI is not the actual telephone number of telephone 102, but is a key corresponding with basic information identifying the wireless service provider and/or identifying the cell tower from which the 9-1-1 call originated.

Because the pseudo-ANI is for a wireless service provider, ALI database 121 does not have location information for the pseudo-ANI. Consequently, ALI database 121 cannot immediately provide the location information to PSAP 106 because it must attempt to retrieve location information for telephone 102. ALI database 121 may not know which databases or systems contain location information for telephone 102. ALI database 121 does know that the pseudo-ANI is for a particular wireless carrier, so ALI database 121 transmits the pseudo-ANI to the MPC of GMLC for the wireless carrier (assume MPC 124). If MPC 124 does not contain information for telephone 102, then MPC 124 queries another database, and so on until location information is found. The database containing location information transmits the location information to ALI database 121.

Because the PSAP-ALI interface allows only one response to a request, ALI database 121 attempts to collect all call information before responding to PSAP 106. ALI database 121 also attempts to ensure that PSAP 106 receives a response within a reasonable amount of time. Before submitting the request to MPC 124, ALI database 121 sets a timer to indicate how long it will wait for MPC 124 to respond. If MPC 124 responds within the time period, then ALI database 121 responds to PSAP 106 with the location information on telephone 102. The location information may be approximate X, Y coordinates (longitude and latitude) of telephone 102 (assuming a wireless Phase II system).

If MPC 124 does not respond within the time period, then ALI database 121 responds to PSAP 106 with basic call information. The basic call information does not specify the location of telephone 102. The basic call information may merely be information on the wireless service provider or information on the cell tower from which the 9-1-1 call originated. If MPC 124 responds to ALI database 121 with the location information after ALI database 121 has already responded to PSAP 106 with the basic information, ALI database 121 cannot provide the location information on telephone 102 to PSAP 106. As previously stated, ALI database 121 cannot transmit information to PSAP 106 unless PSAP 106 has previously transmitted a request to ALI database 121 that remains unanswered. To obtain the location information from ALI database 121, PSAP 106 will have to submit another request to ALI database 121 for the same information (sometimes referred to as a re-bid).

If ALI database 121 receives another request from PSAP 106, then ALI database 121 will need to determine whether to send the previous location information received from MPC 124, request new location information from MPC 124, handle time-out scenarios, and handle situations where this request may be for a new 9-1-1 call using the same pseudo- ANI. This scenario is further complicated because the ALI database 121 does not know when this call ends and another call with the same pseudo-ANI begins. Thus, ALI database 121 uses an elaborate scheme of timers to determine if the information received from MPC 124 is stale, and determines whether it should return the information for subsequent requests from PSAP 106 or whether it should submit new requests to MPC 124. While ALI database 121 is requesting information from MPC 124 and PSAP 106 is waiting for a response, PSAP 106 may be connected with a calling party possibly engaged in a life or death situation where any bit of information might help determine the best course of action. ALI database 121 cannot tell that it takes more time to determine location information for telephone 102 because of technology overhead. PSAP 106 may have to wait 10 to 15 seconds to be told nothing more than that the 9-1-1 call is a wireless call.

The PSAP-ALI interface puts the PSAP operator in a guessing game. The PSAP operator does not know when the wireless call location information becomes available and does not know how often re-bids should be submitted to receive initial or new information. PSAP operators are taught not to push the re-bid button repeatedly in hopes of getting caller information, as this could have the opposite effect and swamp ALI database 121 or MPC 124 in a manner such that PSAP 106 cannot receive a response.

The PSAP may also query supplemental information systems that are not part of emergency services network 108. For instance, some PSAPs maintain a separate database of supplemental information associated with particular telephone numbers, such as medical information, presence of animals, etc. The separate databases do not interoperate with the emergency services network 108. When an operator of the PSAP receives an emergency call, the operator manually queries the separate databases for supplemental information associated with the telephone number. Unfortunately, setting up and maintaining these separate and independent databases is difficult and inefficient.

As is illustrated above, the current emergency services networks use old technology, are not very flexible in updating or improving existing services, and are not readily expandable to add new and better services. The importance of emergency services networks demands that these networks evolve to provide the best and most reliable services.

Description of the Invention

FIGS. 2A–2B, 3, 4A–4C, and 5 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 2A:
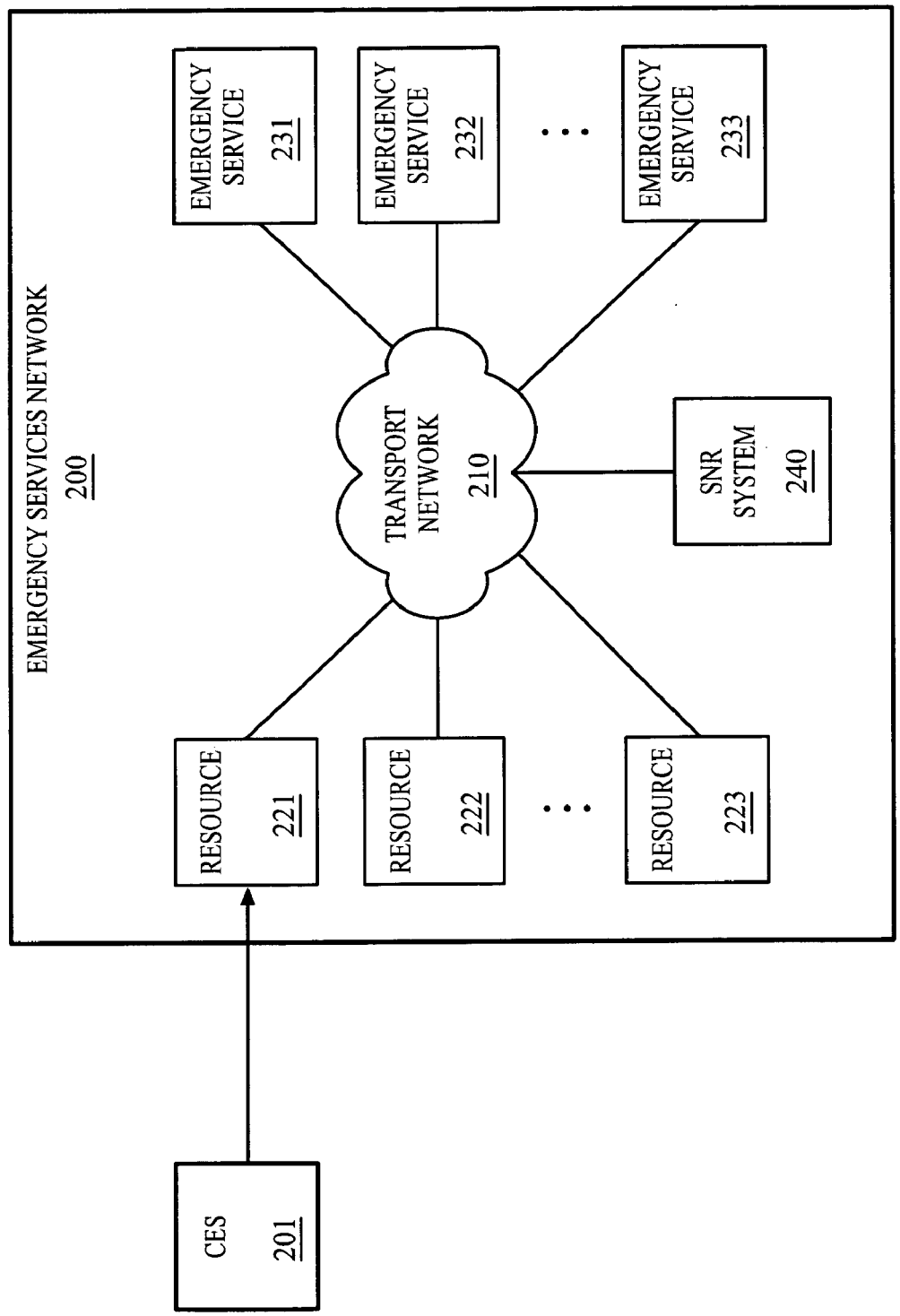
FIG. 2A illustrates a communication network in an exemplary embodiment of the invention.

FIG. 2A illustrates an emergency services network 200 in an exemplary embodiment of the invention. Emergency services network 200 includes a plurality of resources 221–223, a plurality of emergency services 231–233, and a Service/Name Resolution (SNR) system 240 connected to a transport network 210. Resource 221 is illustrated as being connected to a conforming emergency system (CES) 201. Emergency services network 200 may include other devices, resources, systems, SNR systems, or emergency services not shown in FIG. 2A for the sake of brevity. FIG. 2A is intended to illustrate emergency services network 200 in a more functional manner than a physical manner. Depending on the embodiment, resource 221 may be part of CES 201, may be part of emergency services 231–233, or an independent system.

A conforming emergency system comprises any system, device, or equipment configured to communicate according to the message set used by an emergency services network to access emergency services (not shown) to handle emergency events. One example of a conforming emergency system is a computer system for a Public Safety Answering Point (PSAP) conforming to the message set used by an emergency services network. A PSAP is known in the art of emergency services as a location where an emergency call (e.g., a 9-1-1 call) is answered. Another example of a conforming emergency system is a computer system for a hospital, a police department, a fire station, a fire alarm company, a security company, an ambulance service, a state 9-1-1 coordinator, the Federal Emergency Management Agency (FEMA), the Department of Homeland Security, the National Geophysical Data Center, the Center for Disease Control (CDC), etc, that conforms to the message set used by an emergency services network and is used to access in emergency services to handle emergency events. An emergency event comprises any instance or situation where a request for emergency services may be made. Examples of an emergency event include any abbreviated number call (e.g., a 9-1-1 call in the U.S., a 3-1-1 call in the U.S., and a 1-1-2 call in Europe), any call or request from a computer, a PDA, a TDD device, or any other device for emergency services, an email message, an SMS message, an Internet message, a call or signal to an emergency call center (e.g., an independent alarm service, OnStarg, etc), or any other request for emergency services.

A transport network in this embodiment comprises any connection(s), path(s), etc for supporting a media channel, such as a packet network, an Internet Protocol (IP) network, a frame relay network, an X.25 network, an Asynchronous Transfer Mode (ATM) network, wireless connections, satellite connections, wireline connections, etc. A resource comprises any system, device, equipment, or server configured to communicate with a conforming emergency system via a media channel over a transport network to facilitate the handling of emergency events. An example of a resource includes a response gateway. A media channel comprises any communication path or paths (logical, virtual, or otherwise) over a transport network configured to transport data such as video, audio, voice, graphics, text data, binary data, executable instructions or scripts, etc. A media channel is not a physical or logical point-to-point dedicated connection over a transport network. The media channel may transport control messages or may operate in conjunction with a separate control channel. A response gateway comprises any system or server configured to communicate with a conforming emergency system via a media channel over a packet network, and interface the conforming emergency system with emergency services of an emergency services network.

An emergency services network includes any network or networks that provide emergency services or facilitates a conforming emergency system in handling emergency events. Emergency services comprise any services subscribed to or provided for an emergency call or other event requiring such services. One example of an emergency service is an ALI database that provides location information. Another example of an emergency service is a Mobile Positioning Center (MPC) or a Gateway Mobile Location Center (GMLC) that provides location information for mobile devices. Another example of an emergency service is a Voice over Internet Protocol (VoIP) server or a selective transfer point determination system that provides location information for a VoIP phone or device. Another example of an emergency service is an Emergency Auxiliary Service Provider (EASP) or an Emergency Information Service that are general terms for any service provider that provides information or performs a function. For instance, an EASP may contain medical information for a subscriber and information on a subscriber's premises, such as a code to a front gate, guard dogs, hazardous materials, etc. The EASP may also include a third-party notification service that notifies third parties of an emergency event. The term "emergency service" is intended to include any accompanying structure that performs the emergency services, such as processing systems, computing platforms, network interfaces, servers, etc. The function of a resource may be included in or as part of an emergency service. Thus, a resource may also include an ALI database, an MPC, a GMLC, an EASP, a VoIP server, or any other emergency service.

Figure 2B:
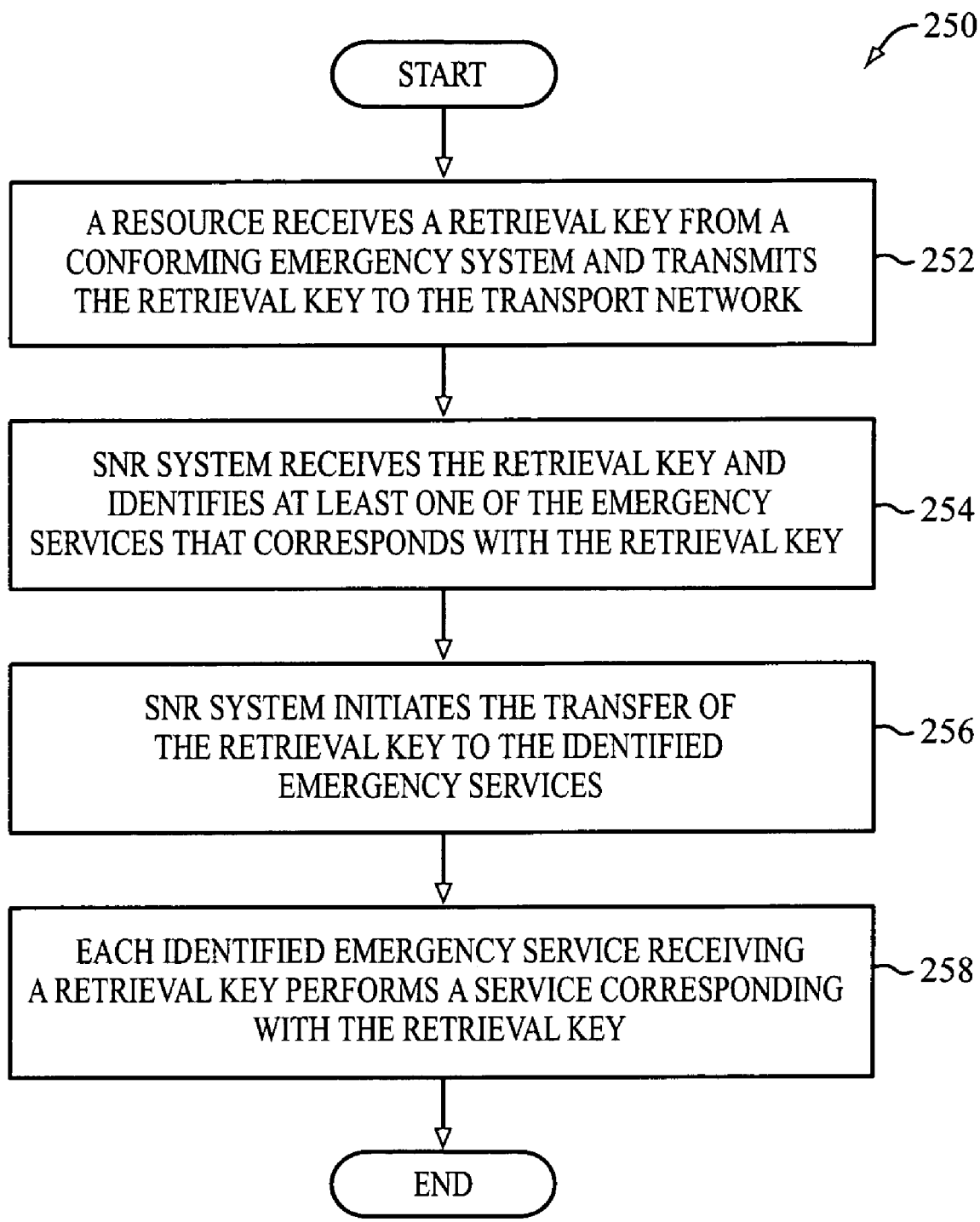
FIG. 2B is a flow chart illustrating a method in an exemplary embodiment of the invention.

FIG. 2B is a flow chart illustrating a method 250 in an exemplary embodiment of the invention. In step 252, one of the resources 221–223 (illustrated as resource 221) receives a retrieval key from conforming emergency system 201. A retrieval key comprises any indicator, token, or key, such as a telephone number (including a dialed number, Emergency Service Routing Digits (ESRD), Emergency Service Routing Keys (ESRK), or any other string of digits according to the E.164 encoding scheme), a network address (including a Session Initiation Protocol (SIP) address, a MAC address, an IP address, a Universal Resource Identifier, or any other form of identification associated with a communication device), a trunk ID, a social security number, a street address, an employee ID, an email address, and an incident ID. Resource 221 transmits the retrieval key to transport network 210.

In step 254, SNR system 240 receives the retrieval key over transport network 210. SNR system 240 identifies at least one of the emergency services 231–233 that corresponds with the retrieval key. In some embodiments, the function of identifying at least one of the emergency services 231–233 that corresponds with the retrieval key is a two-step process. In the first step, SNR system 240 determines which emergency services 231–233 may be associated with the retrieval key, such as by containing information for the retrieval key or having another subscription for the retrieval key (e.g., notification services). In the second step, SNR system 240 determines which of the emergency services associated with the retrieval key should be contacted based on any number of factors. One factor may be the type of information or service provided by the emergency service, such as a shell record for ALI information, information for a wireless call, notification service, information for a VoIP call, location information, etc. For example, if SNR system 240 determines that an ALI database contains a shell record for ALI information for the retrieval key, then SNR system 240 knows that it needs to obtain information for a wireless call from an MPC or GMLC. The second step helps avoid two emergency services from providing the same information or the same service for a retrieval key.

In step 256, SNR system 240 initiates the transfer of the retrieval key to the identified emergency services 231–233. In step 258, each identified emergency service 231–233 receiving a retrieval key performs a service corresponding with the retrieval key. In some embodiments, each of the identified emergency services 231–233 do not necessarily perform a service, as some of the identified emergency services 231–233 may be redundant or the service may not be needed or available.

In some embodiments, a service performed by an identified emergency service 231–233 may be transmitting information corresponding with the retrieval key to SNR system 240, resource 221, or conforming emergency system 201 responsive to receiving the retrieval key. In other embodiments, a service performed by an identified emergency service 231–233 may be notifying third parties of an emergency event.

In some embodiments, resource 221 or CES 201 may have update information for a retrieval key. SNR system 240 operates as described above to identify the emergency services 231–233 corresponding with the retrieval key. With the emergency services identified, resource 221, CES 201, or SNR system 240 may push the update information to the emergency services 231–233.

Figure 3:
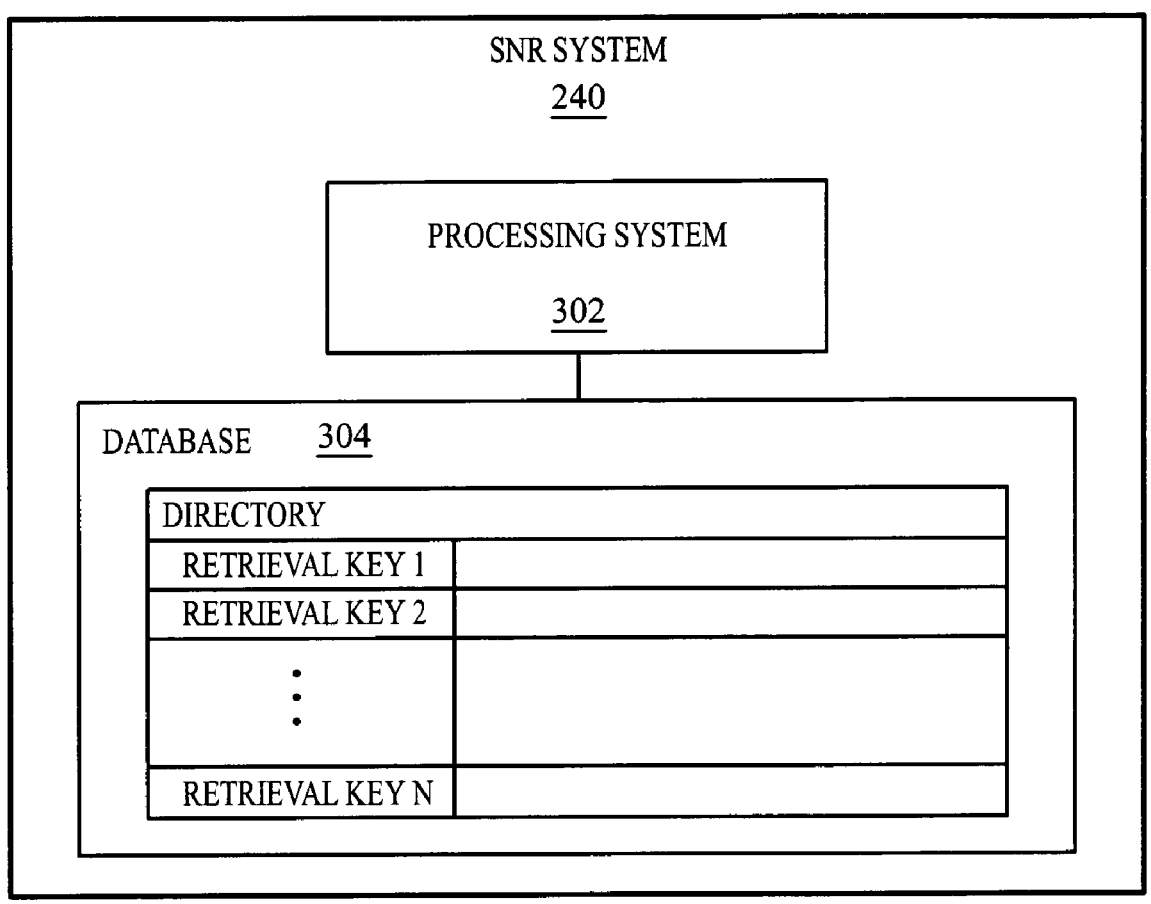
FIG. 3 illustrates an SNR system in an exemplary embodiment of the invention.

FIG. 3 illustrates an SNR system 240 in an exemplary embodiment of the invention. SNR system 240 includes a processing system 302 coupled to a database 304. Database 304 includes a directory correlating retrieval keys to emergency services 231–233 in emergency services network 200. SNR system 240 may include other systems, components, devices, etc, not shown in FIG. 3.

In operation, processing system 302 receives a retrieval key from resource 221 in emergency services network 200 (see FIG. 2A). Processing system 302 accesses database 304 to identify at least one of emergency services 231–233 corresponding with the retrieval key. Processing system 302 then initiates the transfer of the retrieval key to the identified emergency services 231–233.

In order for database 304 to include the directory correlating retrieval keys to emergency services 231–233, emergency services 231–233 register the retrieval keys with SNR system 240 for which they contain information or that have subscribed to the emergency service. Emergency services 231–233 may also register other data with the retrieval keys, such as attributes of the emergency service, a format of the information contained in the emergency service, etc. Processing system 302 may update database 304 regularly on either a static basis or a dynamic basis. Static updating may be done periodically (once a week or month) as required. Dynamic updating is done more often to register information that frequently changes. Dynamic updating may be done for wireless carrier changes, subscriber service changes, subscriber number changes resulting from number portability, etc.

In addition to updating data in database 304 for current emergency services, new emergency services may be added to emergency services network 200 (see FIG. 2A). To add a new emergency service, personnel for the new emergency service contact personnel for SNR system 240, or other authorities, seeking permission to add the new emergency service. If permission is obtained, the personnel for the new emergency service also obtain a pass key (or other authorization code) and connection data for accessing SNR system 240. Once the connection data for SNR system 240 is obtained, the new emergency service transmits connection data for the new emergency service to SNR system 240. The connection data may be a network address or some other indicator of how to communicate with systems and platforms supporting the new emergency service. The new emergency service also transmits a list of retrieval keys having a subscription in the new emergency service. For instance, the new emergency service may transmit a list of retrieval keys for which the new emergency service contains information, such as location information, medical information, etc. The new emergency service may also register other data with the retrieval keys, such as attributes of the emergency service, a format of the information contained in the emergency service, etc.

SNR system 240 receives the connection data for a new emergency service to establish communications with the new emergency service. Processing system 302 of SNR system 240 registers the list of retrieval keys in database 304. Processing system 302 may then access database 304 responsive to receiving a retrieval key to identify the new emergency service as a potential service for the retrieval key.

Figure 4B:
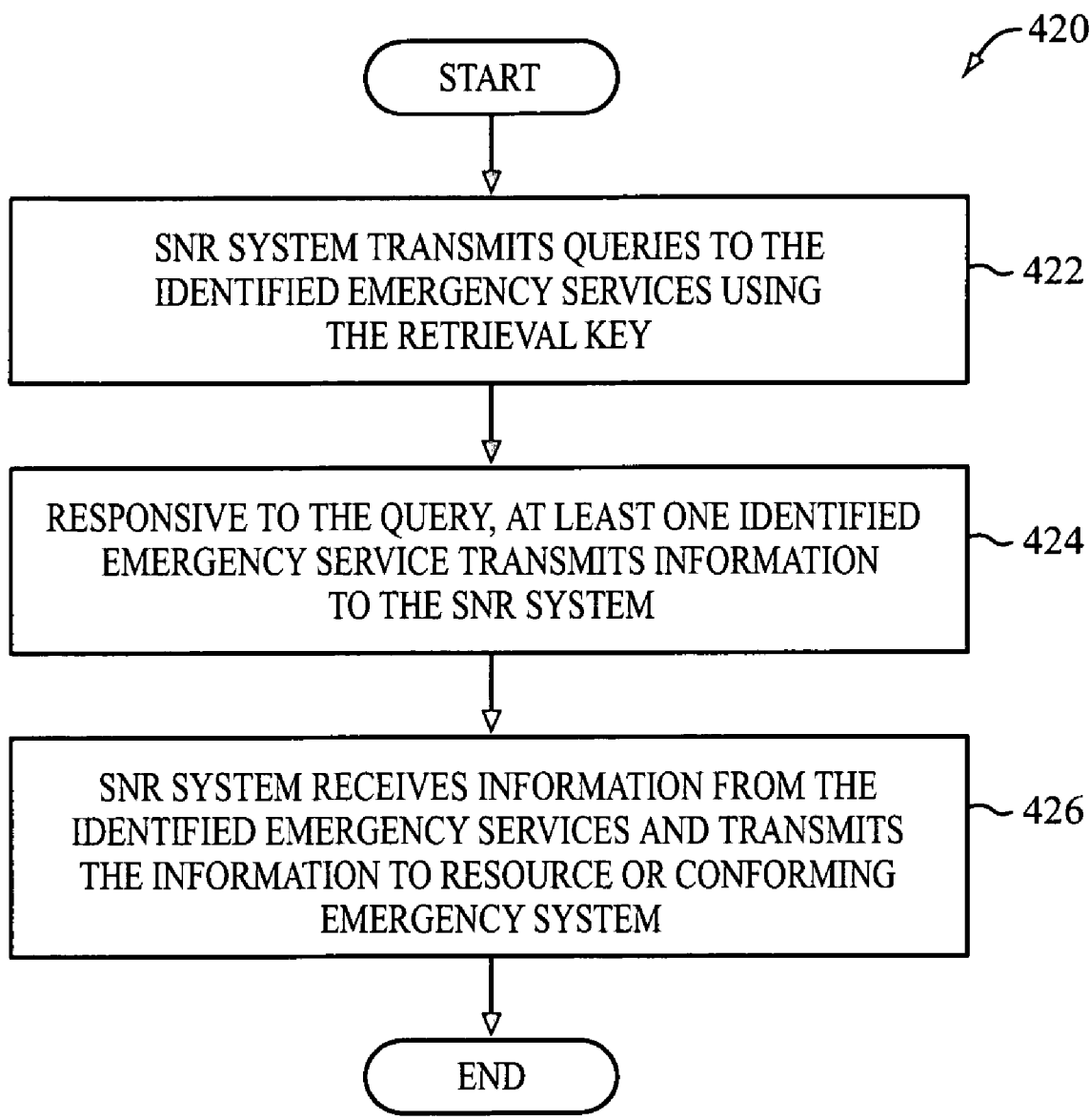
FIG. 4B is a flow chart illustrating another method in an exemplary embodiment of the invention.
Figure 4C:
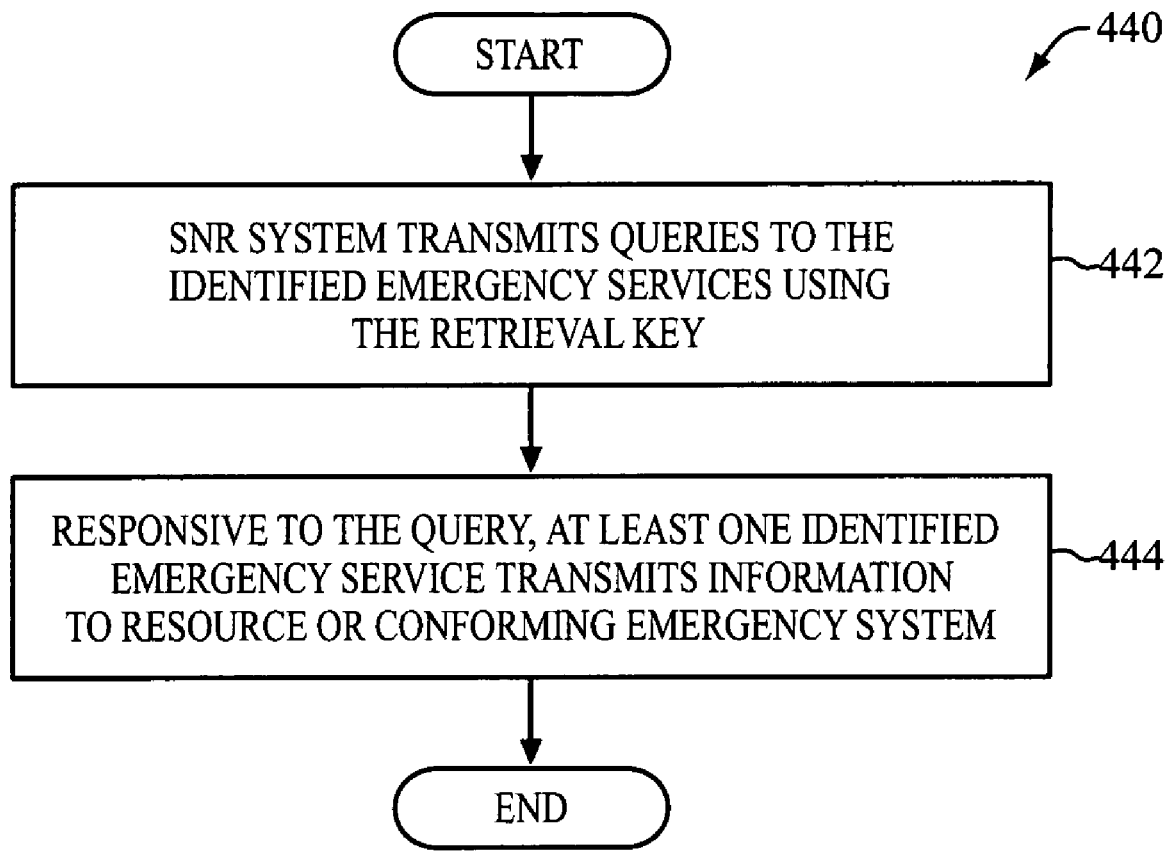
FIG. 4C is a flow chart illustrating another method in an exemplary embodiment of the invention.

SNR system 240 may initiate the transfer of the retrieval key (step 256 in FIG. 2B) in multiple ways, some of which are illustrated in FIGS. 4A–4C as provided below. FIG. 4A is a flow chart illustrating a method 400 in an exemplary embodiment of the invention. In step 402, SNR system 240 transmits a message to resource 221 indicating the identified emergency services 231–233. In step 404, resource 221 receives the message from SNR system 240, and transmits queries that include the retrieval key to the identified emergency services 231–233. In step 406, at least one of the identified emergency services 231–233 transmit information corresponding with the retrieval key to resource 221 or CES 201 responsive to the queries. In some embodiments, one of the identified emergency services 231–233 initiates a notification service for notifying third parties of the emergency event responsive to a query.

FIG. 4B is a flow chart illustrating a method 420 in an exemplary embodiment of the invention. In step 422, SNR system 240 transmits queries that include the retrieval key to the identified emergency services 231–233. In step 424, at least one of the identified emergency services 231–233 transmits information corresponding with the retrieval key to SNR system 240 responsive to the queries. In some embodiments, one of the identified emergency services 231–233 initiates a notification service for notifying third parties of the emergency event responsive to a query. In step 426, SNR system 240 receives the information from the identified emergency services 231–233, and transmits the information to resource 221 or CES 201.

FIG. 4C is a flow chart illustrating a method 440 in an exemplary embodiment of the invention. In step 442, SNR system 240 transmits queries that include the retrieval key to the identified emergency services 231–233. The queries include an instruction to transmit the information to resource 221 or CES 201. In step 444, at least one of the identified emergency services 231–233 transmits information corresponding with the retrieval key to resource 221 or CES 201 responsive to the queries. In some embodiments, one of the identified emergency services 231–233 initiates a notification service for notifying third parties of the emergency event responsive to a query.

Figure 5:
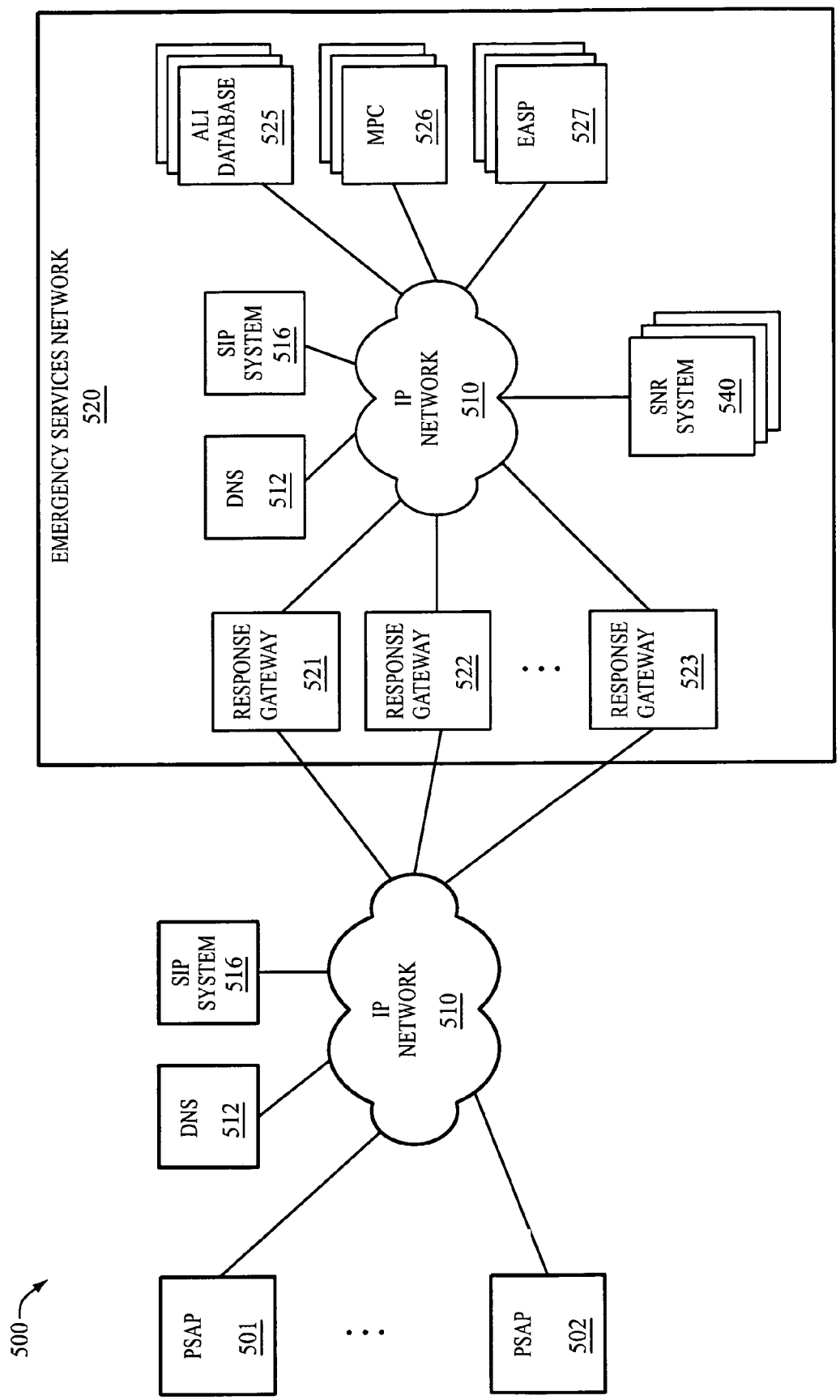
FIG. 5 illustrates another communication network in an exemplary embodiment of the invention.

FIG. 5 illustrates another communication network 500 in an exemplary embodiment of the invention. Communication network 500 includes a plurality of PSAPs 501–502, an Internet Protocol (IP) network 510, a Domain Name Server (DNS) 512, a Session Initiation Protocol (SIP) system 516, and an emergency services network 520. Emergency services network 520 includes a plurality of response gateways 521–523, SNR system 540, ALI databases 525, Mobile Positioning Centers (MPC) 526, and Emergency Auxiliary Service Providers (EASP) 527. PSAPs 501–502, DNS 512, SIP system 516, response gateways 521–523, SNR system 540, ALI databases 525, MPCs 526, and EASPs 527 are connected to packet network 510. Communication network 500 may include other devices, resources, or systems not shown in FIG. 5 for the sake of brevity, such as GMLCs.

Domain name server 512 is known in the art as a system that resolves host names into IP addresses. SIP system 516 comprises any system that uses SIP to assist in dynamically establishing a media channel. Examples of SIP system 516 include a SIP proxy and a SIP server. ALI database 525 (may also be referred to as an ALI system or ALI server) is known in the art of emergency services as a system that provides information on the location of a calling party station (e.g., phone). MPC 526 is known in the art of emergency services as a system that provides information on the location of a mobile calling device (e.g., cell phone). EASP 527 comprises any emergency service configured to provide additional information for an emergency event, such as medical information, information on a subscriber's premises (e.g., guard dogs, hazardous materials, codes for a gate, etc), notify third parties of an emergency event, or provide any other services for an emergency services network.

In operation, PSAP 501 needs to access emergency services network 520 in order to obtain information on an emergency call. Unlike prior networks, PSAP 501 does not have dedicated point-to-point connections with a pair of ALI databases to obtain the information. PSAP 501 has to dynamically establish a media channel with emergency services network 520 to obtain the information.

To start, PSAP 501 initiates setup of a media channel with a response gateway 521–523 of emergency services network 520. PSAP 501 may initiate the setup of a media channel periodically based on a timer, may initiate the setup of a media channel responsive to an instruction from another device or system, or may initiate the setup of a media channel responsive to receiving an emergency call. PSAP 501 uses SIP to initiate the setup of the media channel. PSAP 501 generates an Invite message and transmits the Invite message over a TCP/IP connection to IP network 510. The TCP/IP connection may be a secure connection. The Invite message may include a host address, such as "RG@EmergProvider.com". IP network 510 forwards the host address to DNS 512. DNS 512 resolves the host address in the Invite message to an IP address for SIP system 516, and IP network 510 forwards the Invite message to SIP system 516.

Responsive to receiving the Invite message, SIP system 516 determines which of the response gateways 521–523 is available. SIP system 516 may include logic (not shown) that is able to monitor the availability of response gateways 521–523 and determine which of the response gateways 521–523 is available. Response gateways 521–523 may periodically update SIP system 516 as to their availability and status. SIP system 516 may also query other systems (not shown) having selection logic that is able to determine which of the response gateways 521–523 is available.

SIP system 516 selects one of the response gateways 521–523 (assume response gateway 521). SIP system 516 identifies an IP address of the selected response gateway 521 and forwards the Invite message over IP network 510 to the IP address of the selected response gateway 521.

Response gateway 521 receives the Invite message from SIP system 516 along with an IP address of PSAP 501. Response gateway 521 may authenticate PSAP 501 via a login and password, via a Public Key Infrastructure (PKI) exchange of digital signatures, via public key cryptography, etc. Response gateway 521 may also access the PSAP's authorization to determine specific services available and subscribed to by PSAP 501. Response gateway 521 negotiates with PSAP 501 or SIP system 516 regarding parameters associated with the media channel to be established. Response gateway 521 may use another protocol to facilitate the negotiation of the appropriate protocol or parameters related to the media channel, such as Session Description Protocol (SDP). SDP may be carried within SIP messages to facilitate the establishment of a media channel, the version of the protocol, or parameters associated with the media channel. SDP is one way that two end-points request a media channel and agree upon the nature of the media channel. If response gateway 521 and PSAP 501 agree on the parameters for the media channel, then response gateway 521 forwards an OK message to PSAP 501. PSAP 501 receives the OK message and initiates a process to dynamically establish a media channel. An example of initiating a process is setting up a Secure Sockets Layer (SSL) TCP/IP interface.

SIP system 516 may broker any messages or negotiations between response gateway 521 and PSAP 501 instead of response gateway 521 and PSAP 501 communicating directly.

If the selected response gateway 521 is not able to accept the media channel, then SIP system 516 or another device forwards the Invite message to another response gateway 522–523. The Invite message is forwarded to response gateways 522–523 until a response gateway is found that can accept the media channel.

With the media channel established, PSAP 501 and response gateway 521 may exchange messages over the media channel to help PSAP 501 handle an emergency call. In many cases, PSAP 501 will multiplex multiple messages over the media channel. PSAP 501 and response gateway 521 may use any compatible transport protocol, such as TCP/IP, HTTP, XML, and RTP. PSAP 501 and response gateway 521 may encrypt any transmitted messages for security purposes.

The function of response gateway 521 is to interface PSAP 501 with emergency services in emergency services network 520. Thus, PSAP 501 transmits a message to response gateway 521 that includes an ANI for the emergency call. In other embodiments, a retrieval key or a key other than an ANI may be used, such as a SIP address, a URI, etc.

Response gateway 521 transmits the ANI to SNR system 540. Based on the ANI, SNR system 540 identifies which emergency services (e.g., ALI database 525, MPC 526, and/or EASP 527) in emergency services network 520 have information corresponding with the ANI of the emergency call and the emergency services with which the ANI is associated, such as by subscription. SNR system 540 may identify all emergency services corresponding with the ANI, or may identify a sub-set of the emergency services based on any number of factors, such as the type of information contained in the emergency services. SNR system 540 may then operate in multiple ways responsive to identifying the emergency services corresponding with the ANI.

In a first embodiment, SNR system 540 transmits a message to response gateway 521 identifying the emergency services that correspond with the ANI. Assume that MPC 526 and EASP 527 correspond with the ANI. Responsive to the message from SNR system 540, response gateway 521 transmits queries that include the ANI to MPC 526 and EASP 527. MPC 526 and EASP 527 then transmit information corresponding with the ANI to response gateway 521 responsive to the queries. Response gateway 521 receives the information from MPC 526 and EASP 527 and transmits the information to PSAP 501 to handle the emergency call. In some embodiments, MPC 526 and EASP 527 may transmit information corresponding with the ANI to PSAP 501 directly.

In a second embodiment, SNR system 540 transmits queries that include the ANI to MPC 526 and EASP 527. MPC 526 and EASP 527 then transmit information corresponding with the ANI to SNR system 540 responsive to the queries. SNR system 540 receives the information from MPC 526 and EASP 527 and transmits the information to response gateway 521. Response gateway 521 receives the information from SNR system 540 and transmits the information to PSAP 501 to handle the emergency call. In some embodiments, SNR system 540 may transmit the information to PSAP 501 directly.

In a third embodiment, SNR system 540 transmits queries that include the ANI to MPC 526 and EASP 527. The queries also include instructions to transmit information to response gateway 521. For instance, the instruction may include an address for response gateway 521 instead of an address for SNR system 540. MPC 526 and EASP 527 may then transmit information corresponding with the ANI to response gateway 521 responsive to the queries. Response gateway 521 receives the information from MPC 526 and EASP 527 and transmits the information to PSAP 501 to handle the emergency call. In some embodiments, the queries may include instructions for MPC 526 and EASP 527 to transmit information directly to PSAP 501.

When response gateway 521 communicates with ALI database 525, MPC 526, and EASP 527, response gateway 521 may establish a media channel with each of ALI database 525, MPC 526, and EASP 527. Response gateway 521 may use SIP system 516 to establish the media channel as previously described. The media channels with ALI database 525, MPC 526, and EASP 527 may also be pre-established. The same goes for SNR system 540.

In conclusion, the embodiments of the invention described herein illustrate that an SNR system in an emergency services network provides many advantages over the prior art.

We claim:

1. An emergency services network for providing emergency services for a conforming emergency system, the emergency services network comprising:

a plurality of emergency services connected to a transport network;

a plurality of resources connected to the transport network and to the conforming emergency system, wherein at least one of the plurality of resources is configured to receive a retrieval key from the conforming emergency system and to forward the retrieval key to the transport network; and a service/name resolution (SNR) system connected to the transport network configured to receive the retrieval key over the transport network, to identify at least one of the emergency services associated with the retrieval key, and to forward the retrieval key to the identified emergency services via the transport network.

2. The emergency services network of claim 1 wherein: each identified emergency service receiving the retrieval key is configured to perform a service associated with the retrieval key.

3. The emergency services network of claim 2 wherein: at least one emergency service transmits information associated with the retrieval key to the one resource, the SNR system, or the conforming emergency system responsive to receiving the retrieval key.

4. The emergency services network of claim 3 wherein the information comprises one of streaming video, streaming audio, graphics data, voice, text or binary data, or executable instructions or scripts.

5. The emergency services network of claim 2 wherein:
at least one emergency service initiates a notification service responsive to receiving the retrieval key.

6. The emergency services network of claim 1 wherein the SNR system is further configured to determine if the identified emergency services are available.

7. The emergency services network of claim 1 wherein the SNR system being configured to forward the retrieval key to the identified emergency services comprises:
the SNR system is configured to transmit a message to the one resource indicating the identified emergency services via the transport network; and
the one resource is configured to receive the message from the SNR system, and to transmit queries that include the retrieval key to the identified emergency services via the transport network.

8. The emergency services network of claim 7 wherein:
at least one of the identified emergency services is configured to be responsive to the queries by transmitting information associated with the retrieval key to the one resource via the transport network; and
the one resource is configured to receive the information associated with the retrieval key and to transmit the information to the conforming emergency system to facilitate the conforming emergency system in handling an emergency event.

9. The emergency services network of claim 7 wherein at least one of the identified emergency services is configured to be responsive to the queries by transmitting information associated with the retrieval key to the conforming emergency system via the transport network to facilitate the conforming emergency system in handling an emergency event.

10. The emergency services network of claim 7 wherein one of the identified emergency services is configured to initiate a notification service for notifying third parties of an emergency event responsive to a query.

11. The emergency services network of claim 1 wherein the SNR system being configured to forward of the retrieval key to the identified emergency services comprises:
the SNR system is configured to transmit queries that include the retrieval key to the identified emergency services.

12. The emergency services network of claim 11 wherein:
at least one of the identified emergency services is configured to respond to the queries by transmitting information associated with the retrieval key to the SNR system via the transport network;
the SNR system is configured to receive the information corresponding with the retrieval key and to transmit the information to the one resource via the transport network; and
the one resource is configured to receive the information associated with the retrieval key and to transmit the information via the transport network to the conforming emergency system to facilitate the conforming emergency system in handling an emergency event.

13. The emergency services network of claim 11 wherein one of the identified emergency services is configured to initiate a notification service for notifying third parties of the emergency event responsive to a query.

14. The emergency services network of claim 11 wherein at least one of the queries to one of the identified emergency services includes an instruction to transmit information to the one resource.

15. The emergency services network of claim 14 wherein:
the one identified emergency service is configured to respond to the one query by transmitting information corresponding with the retrieval key to the one resource via the transport network; and
the one resource is configured to receive the information associated with the retrieval key and to transmit the information to the conforming emergency system via the transport network to facilitate the conforming emergency system in handling an emergency event.

16. The emergency services network of claim 11 wherein at least one of the queries to one of the identified emergency services includes an instruction to transmit information to the conforming emergency system.

17. The emergency services network of claim 16 wherein:
the one identified emergency service is configured to respond to the one query by transmitting information corresponding with the retrieval key to the conforming emergency system via the transport network.

18. The emergency services network of claim 1 wherein:
the SNR system is configured to receive connection data for a new emergency service to establish communications with the new emergency service.

19. The emergency services network of claim 18 wherein the connection data includes a network address in the transport network for the new emergency service.

20. The emergency services network of claim 18 wherein:
the SNR system is configured to receive a list of retrieval keys having a subscription in the new emergency service, and registers the list of retrieval keys in a database.

21. The emergency services network of claim 1 wherein the one resource comprises a response gateway.

22. The emergency services network of claim 1 wherein the conforming emergency system comprises a computer system in one of a Public Safety Answering Point (PSAP), a hospital, a police department, a fire station, a fire alarm company, a security company, an ambulance service, a state 9-1-1 coordinator, the Federal Emergency Management Agency (FEMA), the Department of Homeland Security, the National Geophysical Data Center, or the Center for Disease Control (CDC).

23. The emergency services network of claim 1 wherein the plurality of emergency services includes at least one of an ALI database, a Mobile Positioning Center (MPC), a Gateway Mobile Location Center (GMLC), an Emergency Auxiliary Service Provider (EASP), and a Voice over Internet Protocol (VoIP) server.

24. The emergency services network of claim 1 wherein the retrieval key comprises one of a telephone number, a network address, a Session Initiation Protocol (SIP) address, a trunk ID, a social security number, a street address, an employee ID, an email address, and an incident ID.

25. The emergency services network of claim 1 wherein the transport network comprises a packet network.

26. The emergency services network of claim 25 wherein the packet network comprises an Internet Protocol (IP) network.

27. The emergency services network of claim 1 wherein at least one of the emergency services receives update information pushed by the conforming emergency system.

28. A method of operating an emergency services network for providing emergency services, the emergency services network comprising a transport network, a plurality of resources connected to the transport network, a plurality of emergency services connected to the transport network, and an SNR system connected to the transport network, the method comprising the steps of:

receiving a retrieval key in one of the plurality of resources from a conforming emergency system (CES);

transmitting the retrieval key from the one resource to the transport network; and receiving the retrieval key in the SNR system over the transport network, identifying at least one of the emergency services that corresponds with the retrieval key, and transferring the retrieval key to the identified emergency services over the transport network.

29. The method of claim 28 further comprising the step of:
performing a service associated with the retrieval key in each identified emergency service receiving the retrieval key.

30. The method of claim 29 further comprising the step of:
transmitting information associated with the retrieval key over the transport network from at least one emergency service to the one resource, the SNR system, or the conforming emergency system responsive to receiving the retrieval key.

31. The method of claim 29 further comprising the step of:
initiating a notification service responsive to receiving the retrieval key in at least one emergency service.

32. The method of claim 28 further comprising the step of:
determining if the identified emergency services are available in the SNR system.

33. The method of claim 28 wherein the step of initiating the transfer of the retrieval key to the identified emergency services comprises:

transmitting a message over the transport network from the SNR system to the one resource indicating the identified emergency services; and receiving the message in the one resource from time SNR system, and transmitting queries over the transport network that include the retrieval key to the identified emergency services.

34. The method of claim 33 further comprising the steps of:

responding to the queries in at least one of the identified emergency services by transmitting information over the transport network associated with the retrieval key to the one resource; and receiving the information associated with the retrieval key in the one resource and transmitting the information over the transport network to the conforming emergency system to facilitate the conforming emergency system in handling an emergency event.

35. The method of claim 33 further comprising the step of:
responding to the queries in at least one of the identified emergency services by transmitting information over the transport network associated with the retrieval key to the conforming emergency system to facilitate the conforming emergency system in handling an emergency event.

36. The method of claim 33 further comprising the step of:
initiating a notification service in one of the identified emergency services for notifying third parties of an emergency event responsive to a query.

37. The method of claim 28 wherein the step of transferring the retrieval key to the identified emergency services comprises:

transmitting queries over the transport network that include the retrieval key from the SNR system to the identified emergency services.

38. The method of claim 37 further comprising the steps of:

responding to the queries in at least one of the identified emergency services by transmitting information over the transport network associated with the retrieval key to the SNR system;

receiving the information associated with the retrieval key in the SNR system and transmitting the information to the one resource over the transport network; and receiving the information associated with the retrieval key in the one resource and transmitting the information over the transport network to the conforming emergency system to facilitate the conforming emergency system in handling an emergency event.

39. The method of claim 37 further comprising the step of:
initiating a notification service in one of the identified emergency services for notifying third parties of the emergency event responsive to a query.

40. The method of claim 37 further comprising the steps of:

responding to the query in the identified emergency service by transmitting information corresponding with the retrieval key to the one resource; and receiving the information corresponding with the retrieval key in the one resource and transmitting the information to the conforming emergency system to facilitate the conforming emergency system in handling an emergency event.

41. The method of claim 28 further comprising the step of:
receiving connection data for a new emergency service in the SNR system to establish communications with the new emergency service.

42. The method of claim 41 wherein receiving connection data includes receiving a network address for the new emergency service.

43. The method of claim 41 further comprising the steps of:

receiving a list of retrieval keys having a subscription in the new emergency service; and registering the list of retrieval keys in a database.

44. The method of claim 28 further comprising the step of:
receiving update information in at least one of the emergency services pushed by the conforming emergency system.

45. A service/name resolution (SNR) system for use in an emergency services network, said emergency services network comprising a transport network, a plurality of resources connected to the transport network and a plurality of emergency services connected to the transport network, the SNR system comprising:

a database comprising a directory correlating retrieval keys to the emergency services in the emergency services network; and a processing system connected to the database, configured to access the database to identify at least one of a plurality of emergency services in the emergency services network that corresponds with a received retrieval key, and configured to transfer the retrieval key to the identified emergency services via the transport network.

46. The SNR system of claim 45 wherein:
the processing system is configured to access the database to determine if the identified emergency services are available.

47. The SNR system of claim 45 wherein the processing system being configured to transfer the retrieval key to the identified emergency services comprises:
the processing system is configured to transmit a message to a resource of the emergency services network indicating the identified emergency services.

48. The SNR system of claim 45 wherein the processing system being configured to transfer the retrieval key to the identified emergency services comprises:
the processing system is configured to transmit queries that include the retrieval key to the identified emergency services.

49. The SNR system of claim 48 wherein:
the processing system receives the information from at least one of the identified emergency services, and transmits the information to a resource of the emergency services network.

50. The SNR system of claim 48 wherein:
the processing system is configured to receive information from at least one of the identified emergency services, and is configured to transmit the information to a conforming emergency system connected to the emergency services network.

51. The SNR system of claim 48 wherein at least one of the queries includes an instruction to transmit the information to a resource of the emergency services network.

52. The SNR system of claim 48 wherein at least one of the queries includes an instruction to transmit the information to a conforming emergency system connected to the emergency services network.

53. The SNR system of claim 45 wherein:
the processing system is configured to receive connection data for a new emergency service to establish communications with the new emergency service.

54. The SNR system of claim 53 wherein connection data includes a network address for the new emergency service.

55. The SNR system of claim 53 wherein:
the processing system is configured to receive a list of retrieval keys having a subscription in the new emergency service, and is confirmed to register the list of retrieval keys in the database.

56. The SNR system of claim 45 wherein the plurality of emergency services includes at least one of an ALI database, a Mobile Positioning Center (MPC), a Gateway Mobile Location Center (GMLC), an Emergency Auxiliary Service Provider (EASP), and a Voice over Internet Protocol (VoIP) server.

57. The SNR system of claim 45 wherein the retrieval key comprises one of a telephone number, a network address, a Session Initiation Protocol (SIP) address, a trunk ID, a social security number, a street address, an employee ID, an email address, and an incident ID.

58. A method of operating an SNR system in an emergency services network, said emergency services network comprises a transport network, a plurality of resources connected to the transport network and a plurality of emergency services connected to the transport network, the SNR system comprising a database having a directory that correlates retrieval keys to emergency services in the emergency services network, the method comprising the steps of:
receiving a retrieval key;
accessing the database to identify at least one of a plurality of emergency services in the emergency services network that corresponds with the retrieval key; and
initiating the transfer of the retrieval key to the identified emergency services via the transport network.

59. The method of claim 58 further comprising the step of:
accessing the database to determine if the identified emergency services are available.

60. The method of claim 58 wherein the step of initiating the transfer of the retrieval key to the identified emergency services comprises:
transmitting a message to a resource of the emergency services network indicating the identified emergency services via the transport network.

61. The method of claim 58 wherein the step of initiating the transfer of the retrieval key to the identified emergency services comprises:
transmitting queries that include the retrieval key to the identified emergency services via the transport network.

62. The method of claim 61 further comprising the step of:
receiving the information from at least one of the identified emergency services, and transmitting the information to a resource of the emergency services network via the transport network.

63. The method of claim 61 further comprising the step of:
receiving the information from at least one of the identified emergency services, and transmitting the information to a conforming emergency system connected to the emergency services network via the transport network.

64. The method of claim 61 wherein at least one of the queries includes an instruction to transmit the information to a resource of the emergency services network via the transport network.

65. The method of claim 61 wherein at least one of the queries includes an instruction to transmit the information to a conforming emergency system connected to the emergency services network via the transport network.

66. The method of claim 58 further comprising the step of:
receiving connection data for a new emergency service to establish communications with the new emergency service.

67. The method of claim 66 wherein connection data includes a network address for the new emergency service.

68. The method of claim 66 further comprising the step of:
receiving a list of retrieval keys having a subscription in the new emergency service; and
registering the list of retrieval keys in the database.

* * * * *